E. DORR.
Horse Rake.
No. 92,521.
Patented July 13, 1869.
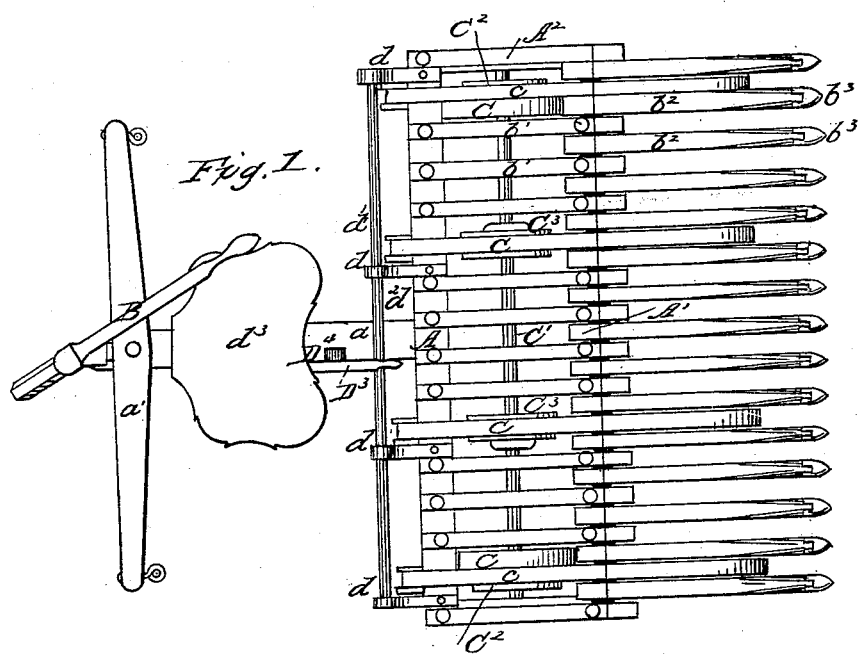
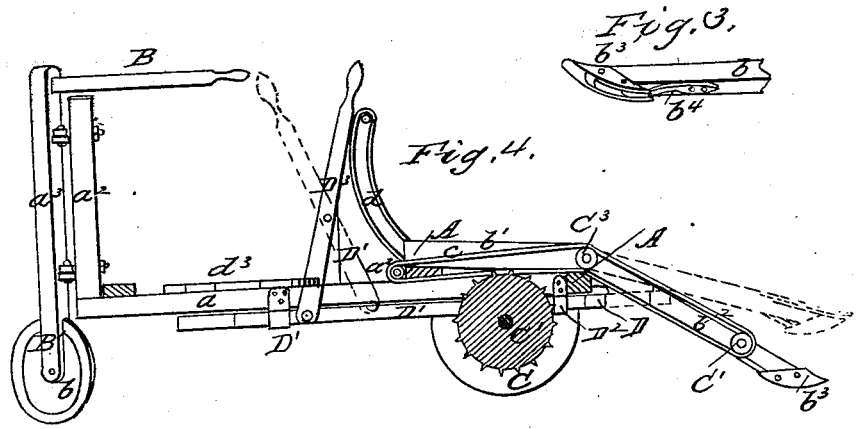
Witnesses:
Chas. F. Brown,
H. M. Whittesey
Inventor:
Edward Dorr
by J. W. Beadle
Atty.

United States Patent Office.

EDWARD DORR, OF ROCKFORD, ILLINOIS.

*Letters Patent No. 92,521, dated July 13, 1869.*

IMPROVEMENT IN HORSE-RAKES.

*The Schedule referred to in these Letters Patent and making part of the same.*

*To all whom it may concern:*

Be it known that I, EDWARD DORR, of Rockford, in the county of Winnebago, and State of Illinois, have invented certain new and useful Improvements in Machines for Raking, Loading, and Carrying Hay, Grain, &c., of which the following is a full, clear, and exact description.

My invention relates more especially to that class of machines for gathering and loading cut crops, in which the gathering-mechanism travels in advance of the team.

The object of the first part of the invention is to enable the rake-teeth to conform closely to the surface of the ground to gather up all the crop: and The improvement consists—

First, in a novel method of combining gathering-teeth, hinged to the main frame of the machine, in such manner as to allow them free vertical play, with shoes likewise pivoted to play freely vertically on the points of the teeth and springs, to hold the shoes in close contact with the ground.

The object of the next part of the invention is to gather the crop; and

Second, the improvement further consists in a novel method of combining pivoted shoes and hinged teeth with endless carrying-belts, working between and vibrating with the teeth.

Third, the improvement further consists in a novel method of combining hinged teeth and elevating-belts with mechanism operated by the driver, by which he raises the rake-teeth.

Fourth, the improvement further consists in a novel method of combining the elevating-belts, running over pulleys both in front and in rear of the main axle, with sprocket-wheels on the main axle, driving the belts by contact with them between the pulleys over which they run.

Fifth, the improvement further consists in a novel method of combining a main frame mounted on two wheels, hinged teeth, and elevating carrying-belts, with a rigid tongue, supported by a steering-wheel behind the main frame, carrying a stand for the driver between the horses, and a lifting-lever to regulate the rake-teeth, by which means the driver can see the whole machine, and readily adjust and guide it.

The object of the next part of my invention is to gather cut crops, convey them to any desired point, and there discharge them in bulk simply by backing the machine; and The improvement consists in a novel method of combining inclined gathering-teeth and endless conveyers or belts with a carriage propelled from behind.

In the accompanying drawings, which make part of this specification—

Figure 1 represents a plan or top view of a machine embodying all my improvements;

Figure 2, a vertical longitudinal section through the same, at the line $x\ x$ of fig. 1; and Figure 3, a view in perspective of one of the teeth, its hinged shoe and spring, as seen from beneath.

In this instance, a stout main frame, $A\ A^1\ A^2\ A^3$, is shown as resting on an axle, $C'$, mounted on two wheels $C$.

A perch, $a$, rigidly secured to and projecting behind this frame, carries a vertical standard, $a^2$, to which a post, $a^3$, is pivoted, so as to turn freely, axially.

A steering-wheel, $b$, on this post, supports the rear end of the perch.

The driver rides on a platform, $d^1$, mounted on the perch, and guides the machine by a tiller, B.

The horses are harnessed to a double-tree, $a$, pivoted near the rear end of the perch, and travel on each side of the driver and behind the machine, thus avoiding the trampling of the crop.

The main frame is covered with parallel slats $b^1$, arranged parallel to the path of the machine.

A rack, $d'$, supported on uprights $d$ on the frame, serves to retain the gathered crop, and as a support which the driver may grasp to steady himself by, if necessary.

Rake-teeth $b^2$ are pivoted to play freely, vertically, between the front ends of the slats $b^1$, and carry at their forward ends shoes $b^3$, rocking vertically on a central pivot.

Springs $b^4$, fastened to the under rear side of the teeth, bear on the under side of the heels of the shoes, and thus serve to keep their toes close to the ground to gather the crop, and yet allow them to yield freely to pass obstructions.

A series of endless carrying-belts, $c$, is arranged to pass over pulleys $c^1\ c^2\ c^3$ at the back of the frame, at the front of the same, in the line of the joint of the hinged teeth, and near the shoes.

These belts, it will be observed, run in the spaces between the teeth, and their front ends rise and fall with the teeth.

These belts are driven by sprocket-wheels $C$ on the main axle, the teeth of which take into holes in the belt, or teeth might be fixed on the belt, and take into notches on the wheels.

It will be observed, however, that in this instance, instead of the belts passing around the sprocket-wheel, the teeth act on the under side of the lower part of the belt only. This is important, as it causes the upper part of the belt to move backward to elevate the hay, and thus dispenses with gearing or crossed belts, which would be necessary if the belts encircled the sprocket-wheel.

The rake-teeth are vibrated on their pivots by means of a cross-bar, D, (underneath them,) supported and moving endwise in stirrups $D^2$, and reciprocated by means of a hand-lever, $D^3$, vibrating back and forth in a vertical plane, on a pivot in a standard, $D^4$, on the perch.

When the lever is retracted, the parts assume the position shown in red, in fig. 2, and the shoes and teeth are elevated.

The operation of the machine will readily be understood. As the machine is propelled over the field, with the teeth depressed, the shoes run close to the ground, and under the crop, which rises up the inclined surface of the teeth, and is deposited by the belts in a cradle, of which the slats $b^1$ form the bottom. When the cradle is full, the lever-handle is moved backward, which thrusts the lifting-bar D forward, and raises the teeth.

The machine may then be driven to the desired spot, and the crop discharged by lowering the teeth and backing the machine a short distance, which reverses the motion of the belt and discharges the crop from the cradle.

The gathered crop may likewise be discharged at any time, by simply backing the machine without lifting the teeth.

What I claim as my invention, and desire to secure by Letters Patent, is—

1. The combination of the hinged rake-teeth, constructed as described, with the pivoted spring-shoes constructed and operating as described.

2. The combination, substantially as set forth, of spring-shoes and hinged rake-teeth with elevating-belts, working between and vibrating with the teeth.

3. The combination of hinged rake-teeth and elevating-belts with the elevating-mechanism operated by the driver, as set forth.

4. The combination of the elevating-belts with sprocket-wheels, acting on their under surfaces between their supporting-pulleys, substantially as set forth.

5. The combination, substantially as set forth, of the driving-wheels, the main frame, and the hinged teeth, and carrying-belts in front of the frame, with the rigid tongue or perch, the steering-wheel, the driver's stand, and the lifting-lever in rear of the main frame, for the purposes specified.

6. The combination of inclined gathering-teeth and endless belts or conveyers with a main frame, mounted on wheels and propelled from behind, substantially as set forth, to discharge the gathered crop simply by backing the machine.

This specification signed and witnessed, this 13th day of January, 1869.

EDWARD DORR.

Witnesses:
G. W. FORD,
C. ROBERTS.